United States Patent [19]
Vogt

[11] 3,820,099
[45] June 25, 1974

[54] VOLTAGE DETECTOR
[75] Inventor: Kenneth S. Vogt, Kokomo, Ind.
[73] Assignee: General Motors Corporation, Detroit, Mich.
[22] Filed: Apr. 17, 1972
[21] Appl. No.: 244,571

[52] U.S. Cl. ..... 340/248 A, 340/248 B, 340/248 C, 340/332
[51] Int. Cl. .......................................... G08b 23/00
[58] Field of Search ......... 340/248 A, 248 B, 248 C

[56] References Cited
UNITED STATES PATENTS
3,311,907  3/1967  Teal ................................ 340/248 C
3,449,737  6/1969  Stewart ........................... 340/248 C OTHER PUBLICATIONS
O'Malley, Voltage Detection Circuit, Nov. 1960, Vol. 3, No. 6, IBM Tech. Disclosure Bull., (page 37).

Primary Examiner—Thomas B. Habecker
Attorney, Agent, or Firm—E. W. Christen

[57] ABSTRACT

The magnitude of a monitored voltage is detected with respect to a lower level and an upper level. The lower level is primarily defined by the breakdown potential of a Zener diode. The upper level is primarily defined by a predetermined potential difference between two signal voltages defined in different proportions to the monitored voltage by two different voltage divider networks connected to the Zener diode.

5 Claims, 1 Drawing Figure

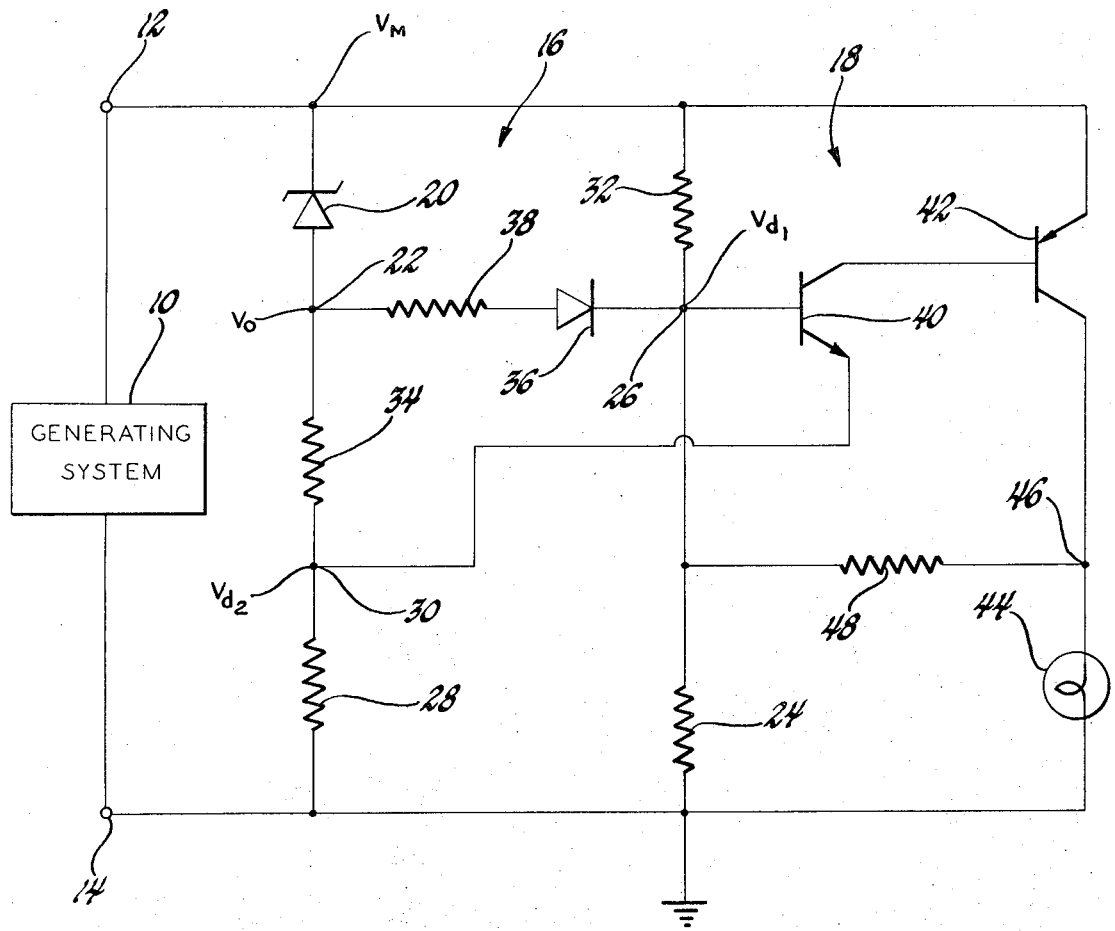

VOLTAGE DETECTOR

DISCLOSURE

This invention relates to a detector circuit for indicating the relationship of a monitored voltage with respect to a lower potential level and an upper potential level.

According to one aspect of the invention, a first signal voltage is developed across a first resistor and a second signal voltage is developed across a second resistor. A third resistor combines with the first resistor to define the first signal voltage in proportion to the monitored voltage such that the difference between the first and second signal voltages is greater than a predetermined trigger potential when the monitored voltage is below the lower level. A Zener diode defines an offset voltage in proportion to the monitored voltage when the monitored voltage is above the lower level. A fourth detector resistor combines with the second resistor to define the second signal voltage in proportion to the offset voltage such that the difference between the first and second signal voltages is less than the trigger potential when the monitored voltage is between the lower level and the upper level. A control diode operates in a forward biased mode to define the first signal voltage in proportion to the offset voltage such that the difference between the first and second signal voltages is greater than the trigger potential when the monitored voltage is above the upper level.

In another aspect of the invention, a comparator is responsive to the first and second signal voltages to produce a first output signal when the difference between the first and second signal voltages is greater than the trigger potential and to produce a second output signal when the difference between the first and second signal voltages is less than the trigger potential. Consequently, the presence of the first output signal indicates that the magnitude of the monitored voltage is either below the lower level or above the upper level. On the other hand, the presence of the second output signal indicates that the magnitude of the monitored voltage is between the lower level and the upper level.

As contemplated by yet another aspect of the invention, a fifth resistor is utilized in conjunction with the control diode and the first resistor so that the first signal voltage is primarily determined by the voltage divider action of the first and fifth resistors when the monitored voltage is above the upper level. Alternately, the first signal voltage is primarily determined by the voltage divider action of the first and third resistors when the monitored voltage is below the lower level. Likewise, the second signal voltage is primarily determined by the voltage divider action of the second and fourth resistors when the monitored voltage is between the lower level and the upper level. Preferably, the second resistor is several orders of magnitude larger than the fifth resistor. Moreover, the ratio of the first resistor to the fifth resistor is preferably of the same order of magnitude as, but greater than, the ratio of the second resistor to the fourth resistor.

According to still another aspect of the invention, the comparator comprises a two-stage switch including first and second transistors of opposite conductivity type each operable between a fully conductive state and a fully nonconductive state. The first transistor is connected to switch toward the fully conductive state when the difference between the first and second signal voltages is greater than the trigger potential and to switch toward the fully nonconductive state when the difference between the first and second signal voltages is less than the trigger potential. The second transistor is connected to switch toward the fully conductive state as the first transistor switches toward the fully conductive state and to switch toward the fully nonconductive state as the second transistor switches toward the fully nonconductive state. In addition, a feedback resistor is connected from the output of the second transistor back to the input of the first transistor to increase the first signal voltage as the second transistor switches toward the fully conductive state and to decrease the first signal voltage as the second transistor switches toward the fully nonconductive state thereby to accelerate the switching of the first and second transistors between the fully conductive state and the fully nonconductive state. Further, the comparator includes a signal lamp connected with the second transistor such that the signal lamp is turned on when the second transistor switches to the fully conductive state and is turned off when the second transistor switches to the fully nonconductive state.

These and other aspects and advantages of the invention will become more apparent by reference to the following detailed description of a preferred embodiment when considered in conjunction with the accompanying drawing. In the drawing, the sole FIGURE is a schematic diagram of a detector circuit incorporating the principles of the invention.

Referring to the drawing, a voltage generating system 10 produces a voltage to be monitored $V_m$ between a first supply terminal 12 and a second supply terminal 14. A voltage detector comprising a voltage sensor 16 and a voltage comparator 18 is connected between the supply terminals 12 and 14 for indicating the relative magnitude of the monitored voltage $V_m$ with respect to a lower level $L_o$ and an upper level $L_u$. As an example, the voltage generating system 10 may be the battery charging system of an automotive vehicle so that the monitored voltage $V_m$ is the charging voltage of the vehicle storage battery. In such case, the lower level $L_o$ may correspond to an undervoltage condition while the upper level $L_u$ may correspond to an overvoltage condition. However, it is to be understood that the voltage generating system 10 may be virtually any electrical system which produces a direct current voltage to be monitored $V_m$ between the first and second supply terminals 12 and 14.

In the voltage sensor 16, a Zener diode 20 is connected between an offset junction 22 and the first supply terminal 12. A first resistor 24 is connected between a first signal junction 26 and the second supply terminal 14. A second resistor 28 is connected between a second signal junction 30 and the second supply terminal 14. A third resistor 32 is connected between the first signal junction 26 and the first supply terminal 14. A fourth resistor 34 is connected between the second signal junction 30 and the offset junction 22. A control diode 36 is connected in series with a fifth resistor 38 between the offset junction 22 and the first signal junction 26.

In the voltage comparator 18, a switching device is provided by a first transistor 40 and a second transistor 42 while an indicator device is provided by a signal lamp 44. The first and second transistors 40 and 42 are of opposite conductivity type; that is, the first transistor 40 is an NPN junction transistor and the second transistor 42 is a PNP junction transistor. The base electrode of the first transistor 40 is connected directly to the first signal junction 26 and the emitter electrode of the first transistor 40 is connected directly to the second signal junction 30. The collector electrode of the first transistor 40 is connected directly to the base electrode of the second transistor 42. The emitter electrode of the second transistor 42 is connected directly to the first supply terminal 12. The collector electrode of the second transistor 42 is connected directly to an output junction 46. A feedback resistor 48 is connected between the output junction 46 and the first signal junction 26. The signal lamp 44 is connected between the output junction 46 and the second supply terminal 14.

In operation, a first signal voltage $V_{d_1}$ is developed across the first signal resistor 24 at the first detector junction 26. Similarly, a second signal voltage $V_{d_2}$ is developed across the second resistor 28 at the second signal junction 30. When the difference between the magnitude of the first signal voltage $V_{d_1}$ and the magnitude of the second signal voltage $V_{d_2}$ is greater than a predetermined trigger potential, the first transistor 40 switches toward a fully conductive state or turned on condition. Conversely, when the difference between the magnitude of the first signal voltage $V_{d_1}$ and the magnitude of the second signal voltage $V_{d_2}$ is below the predetermined trigger potential, the first transistor 40 switches toward a fully nonconductive state or turned off condition. Hence, the predetermined trigger potential may be defined as that potential difference above which the first transistor 40 switches toward the fully conductive state and below which the first transistor 40 switches toward the fully nonconductive state.

As the first transistor 40 switches toward the fully conductive state, the second transistor 42 also switches toward the fully conductive state or turned on condition. Alternately, as the first transistor 40 switches toward the fully nonconductive state, the second transistor 42 likewise switches toward the fully nonconductive state or turned off condition. When the second transistor 42 is turned on, the indicator lamp 44 is energized to produce a first output signal in the form of the presence of light. When the second transistor 42 is turned off, the indicator lamp 44 is deenergized to produce a second output signal in the form of the absence of light. It should be noted that the illustrated voltage detector exhibits a moderate amount of hysteresis caused by slight differences in the precise level of the trigger potential depending upon whether the monitored voltage $V_m$ is rising or falling in magnitude.

The feedback resistor 48 provides for regenerative switching of the first and second transistors 40 and 42. As the second transistor 42 switches toward the fully conductive state, the feedback resistor 48 acts to effectively raise the magnitude of the first signal voltage $V_{d_1}$ 9 at the junction 26 thereby to rapidly accelerate the switching of the first and second transistors 40 and 42 to the fully conductive state. Conversely, as the second transistor switches toward the fully nonconductive state, the feedback resistor 48 acts to effectively lower the magnitude of the first signal voltage $V_{d_1}$ at the junction 26 thereby to rapidly accelerate the switching of the first and second transistors 40 and 42 to the fully nonconductive state.

As previously described, the magnitude of the monitored voltage $V_m$ is detected with respect to a lower level $L_o$ and an upper level $L_u$. The lower level $L_o$ is primarily defined by the breakdown potential of the Zener diode 20. When the magnitude of the monitored voltage $V_m$ is below the lower level $L_o$, the Zener diode 20 operates in a pre-breakdown mode to effectively isolate the offset junction 22 from the first supply terminal 12. When the magnitude of the monitored voltage $V_m$ is above the lower level $L_o$, the Zener diode 20 operates in a breakdown mode to establish an offset voltage $V_o$ at the junction 22 having a magnitude in proportion to the magnitude of the monitored voltage $V_m$. More precisely, the magnitude of the offset voltage $V_o$ always differs from the magnitude of the monitored voltage $V_m$ by an amount approximately equal to the breakdown potential of the Zener diode 20 assuming that the magnitude of the monitored voltage $V_m$ is above the lower level $L_o$.

When the magnitude of the monitored voltage $V_m$ is below the lower level $L_o$, the third resistor 32 combines in series relationship with the first resistor 24 to define the magnitude of the first signal voltage $V_{d_1}$ at the junction 26 in proportion to the magnitude of the monitored voltage $V_m$ between the supply terminals 12 and 14. In response to the absence of the offset voltage $V_o$, the control diode 36 operates in a reverse biased mode to effectively isolate the first signal junction 26 from the offset junction 22. The magnitude of the first signal voltage $V_{d_1}$ is primarily determined by the ratio of the resistance of the first resistor 24 to the resistance of the third resistor 32 such that the difference between the magnitude of the first signal voltage $V_{d_1}$ and the magnitude of the second signal voltage $V_{d_2}$ is greater than the trigger potential. As a result, the first and second transistors 40 and 42 are switched to the fully conductive state thereby energizing the signal lamp 44.

When the magnitude of the monitored voltage $V_m$ is above the lower level $L_o$, the fourth resistor 34 combines in series relationship with the second resistor 28 to define the magnitude of the second signal voltage $V_{d_2}$ 9 at the junction 30 in proportion to the magnitude of the offset voltage $V_o$ at the junction 22. Initially, the magnitude of the offset voltage $V_o$ is insufficient to forward bias the control diode 36 which remains in a reverse biased mode. The magnitude of the second signal voltage $V_{d_2}$ is primarily determined by the ratio of the resistance of the second resistor 28 to the resistance of the fourth resistor 34 such that the difference between the magnitude of the first signal voltage $V_{d_1}$ and the magnitude of the second signal voltage $V_{d_2}$ is less than the trigger level. Consequently, the first and second transistors 40 and 42 are switched to the fully nonconductive state thereby deenergizing the signal lamp 44.

As the magnitude of the monitored voltage $V_m$ increases above the lower level $L_o$, it is followed by the magnitude of the offset voltage $V_o$. When the magnitude of the offset voltage $V_o$ at the junction 22 is sufficient to place the control diode 36 in a forward biased mode, the fifth resistor 38 combines in series relationship with the first resistor 24 to define the magnitude of the first signal voltage $V_{d_1}$ at the junction 26 in proportion to the magnitude of the offset voltage $V_o$. The resistance of the fifth resistor 38 is several orders of magnitude less than the resistance of the third resistor 32 so that the magnitude of the first signal voltage $V_{d_1}$ is primarily determined by the ratio of the resistance of the first resistor 24 to the resistance of the fifth resistor 38.

Further, the resistance ratio of the first resistor 24 to the fifth resistor 38 is greater than the resistance ratio of the second resistor 28 to the fourth resistor 34. Therefore, the first signal voltage $V_{d_1}$ at the junction 26 represents a greater proportion of the magnitude of the offset voltage $V_o$ at the junction 22 than is represented by the magnitude of the second signal voltage $V_{d_2}$ at the junction 30. In other words, as the magnitude of the monitored voltate $V_m$ increases toward the upper level $L_u$, the rate of increase in the magnitude of the first signal voltage $V_{d_1}$ is greater than the rate of increase in the magnitude of the second signal voltage $V_{d_2}$. Preferably, the resistances of the first, second, fourth and fifth signal resistors 24, 28, 34 and 38 are all of the same order of magnitude.

The upper level $L_u$ of the monitored voltage $V_m$ is primarily defined by the difference between the resistance ratio of the first resistor 24 to the fifth resistor 38 and the resistance ratio of the second resistor 28 to the fourth resistor 34. When the magnitude of the monitored voltage $V_m$ increases above the upper level $L_u$, the difference between the magnitude of the first signal voltage $V_{d_1}$ as primarily determined by the resistance ratio of the first and fifth resistors 24 and 38 and the magnitude of the second signal voltage $V_{d_2}$ as primarily determined by the resistance ratio of the second and fourth resistors 28 and 34 is greater than the trigger potential. Accordingly, the first and second transistors 40 and 42 are switched to the fully conductive state thereby energizing the signal lamp 44.

In a voltage detector constructed in accordance with the illustrated embodiment of the invention, the following components and values were found to yield satisfactory results:

| | |
|---|---|
| monitored voltage $V_m$ | 10–18 volts |
| Zener diode 20 | 12 volts |
| signal lamp 44 | No. 44 |
| control diode 36 | DS-97 |
| transistor 40 | DS-67 |
| transistor 42 | DS-83 |
| resistor 24 | 330 ohms |
| resistor 28 | 270 ohms |
| resistor 32 | 4,300 ohms |
| resistor 34 | 360 ohms |
| resistor 38 | 300 ohms |
| resistor 48 | 10,000 phms |

It will now be apparent that the illustrated embodiment of the invention provides a simple but effective voltage detector for indicating the relative magnitude of the monitored voltage $V_m$ with respect to the lower or undervoltage level $L_o$ and the upper or overvoltage level $L_u$. When the signal lamp 44 is turned on, it indicates that the magnitude of the monitored voltage $V_m$ is either below the lower level $L_o$ or above the upper level $L_u$. On the other hand, when the signal lamp 44 is deenergized, it indicates that the magnitude of the monitored voltage $V_m$ is between the lower level $L_o$ and the upper level $L_u$.

At this point, it will be appreciated that the preferred embodiment of the ivnention is shown for demonstrative purposes only and that various alterations and modifications may be made to the preferred embodiment departing from the spirit and scope of the invention. As a result, the fifth resistor 38 may be eliminated or it may be replaced by another diode like the control diode 36. Likewise, the feedback resistor 48 may be eliminated. However, in both cases, the switching time of the first and second transistors 40 and 42 would be somewhat slower. In addition, to insure the temperature stability of the transistors 40 and 42, it may be desirable to connect a relatively large resistor between the first supply terminal 12 and the common junction formed by the collector electrode of the transistor 40 and the base electrode of the transistor 42.

What is claimed is:

1. A detector circuit for indicating the relationship of a monitored voltage to an upper level and a lower level where the monitored voltage appears between first and second supply terminals, comprising: a Zener diode connected between the first supply terminal and an offset junction for operating in a breakdown mode to establish at the offset junction an offset voltage defined in proportion to the monitored voltage when the monitored voltage is above the lower level; a first resistor connected between a first signal junction and the second supply terminal for developing a first signal voltage thereacross at the first signal junction; a second resistor connected between a second signal junction and the second supply terminal for developing a second signal voltage thereacross at the second signal junction; a third resistor connected between the first signal junction and the first supply terminal for operating in conjunction with the first resistor to define the first signal voltage in proportion to the monitored voltage such that the difference between the first and second signal voltages is greater than a predetermined trigger potential when the monitored voltage is below the lower level; a fourth resistor connected between the second signal junction and the offset junction for operating in conjunction with the second resistor to define the second signal voltage in proportion to the offset voltage such that the difference between the first and second signal voltages is less than the trigger potential when the monitored voltage is between the lower level and the upper level; a control diode connected between the first signal junction and the offset junction for operating in a forward biased mode in conjunction with the first resistor to define the first signal voltage in proportion to the offset voltage such that the difference between the first and second signal voltages is greater than the trigger potential when the monitored voltage is above the upper level; and comparator means connected with the first and second signal junctions for producing a first output signal when the difference between the first and second signal voltages is greater than the trigger potential thereby to indicate that the monitored voltage is either below the lower level or above the upper level and for producing a second output signal when the difference between the first and second signal voltages is less than the trigger potential thereby to indicate that the monitored voltage is between the lower level and the upper level.

2. A detector circuit for indicating the relationship of a monitored voltage to an upper level and a lower level where the monitored voltage appears between first and second supply terminals, comprising: a Zener diode connected between the first supply terminal and an offset junction for operating in a pre-breakdown mode to isolate the offset junction from the first supply terminal when the monitored voltage is below the lower level and for operating in a breakdown mode to establish at the offset junction an offset voltage defined in proportion to the monitored voltage when the monitored voltage is above the lower level; a first resistor connected between a first signal junction and the second signal supply terminal for developing a first signal voltage thereacross at the first signal junction; a second resistor connected between a second signal junction and the second supply terminal for developing a second signal voltage thereacross at the second signal junction; switching means connected to the first and second signal junctions for shifting to a turned on condition when the difference between the first and second signal voltages is greater than a predetermined trigger potential and for shifting to a turned off condition when the difference between the first and second signal voltages is less than the predetermined trigger potential; a third resistor connected between the first signal junction and the first supply terminal for operating in conjunction with the first resistor to define the first signal voltage in proportion to the monitored voltage as determined by the voltage divider action of the first and third resistors such that the difference between the first and second signal voltages is greater than the trigger potential when the monitored voltage is below the lower level thereby to shift the switching means to the turned on condition; a fourth resistor connected between the second signal junction and the offset junction for operating in conjunction with the second resistor to define the second signal voltage in proportion to the offset voltage as determined by the voltage divider action of the second and fourth resistors such that the difference between the first and second signal voltages is less than the trigger potential when the monitored voltage is between the lower level and the upper level thereby to shift the switching means to the turned off condition; a control diode connected between the first signal junction and the offset junction for operating in a reverse biased mode to isolate the first signal junction from the offset junction when the offset voltage is less than the first signal voltage and for operating in a forward biased mode in conjunction with the first resistor to define the first signal voltage in proportion to the offset voltage when the offset voltage is greater than the first signal voltage such that the difference between the first and second signal voltages is greater than the trigger potential when the monitored voltage is above the upper level thereby to shift the switching means to the turned on condition; and an indicator device connected with the switching means for producing a first output signal when the switching means is in the turned on condition thereby to indicate that the monitored voltage is either blow the lower level or above the upper level and for producing a second output signal when the switching means is in the turned off condition thereby to indicate that the monitored voltage is between the lower level and the upper level.

3. A detector circuit for indicating the relative magnitude of a monitored voltage with respect to an upper level and a lower level where the monitored voltage appears between first and second supply terminals, comprising: a Zener diode connected between the first supply terminal and an offset junction for operating in a pre-breakdown mode to isolate the offset junction from the first supply terminal when the magnitude of the monitored voltage is below the lower level and for operating in a breakdown mode to establish at the offset junction an offset junction having a magnitude determined in proportion to the magnitude of the monitored voltage when the magnitude of the monitored voltage is above the lower level; a first resistor connected between a first signal junction and the second supply terminal for developing a first signal voltage thereacross at the first signal junction; a second resistor connected between a second signal junction and the second supply terminal for developing a second signal voltage at the second signal junction; switching means connected to the first and second signal junctions for shifting to a turned on condition when the difference between the magnitude of the first signal voltage and the magnitude of the second signal voltage is greater than a predetermined trigger potential and for shifting to a turned off condition when the difference between the magnitude of the first signal voltage and the magnitude of the second signal voltage is less than the predetermined trigger potential; a third resistor connected between the first signal junction and the first supply terminal for operating in series relationship with the first resistor to define the magnitude of the first signal voltage in proportion to the magnitude of the monitored voltage as primarily determined by the voltage divider action of the first and third resistors such that the difference between the magnitude of the first signal voltage and the magnitude of the second signal voltage is greater than the trigger potential when the magnitude of the monitored voltage is below the lower level thereby to shift the switching means to the turned on condition; a fourth resistor connected between the second signal junction and the offset junction for operating in series relationship with the second resistor to define the magnitude of the second signal voltage in proportion to the magnitude of the offset voltage as primarily determined by the voltage divider action of the second and fourth resistors such that the difference between the magnitude of the first signal voltage and the magnitude of the second signal voltage is less than the trigger potential when the magnitude of the monitored voltage is between the lower level and the upper level thereby to shift the switching means to the turned off condition; a control diode and a fifth resistor connected in series between the first signal junction and the offset junction, the control diode operating in a reverse biased mode to isolate the first signal junction from the offset junction when the offset voltage is less than the first signal voltage and for operating in a forward biased mode to define the magnitude of the first signal voltage in proportion to the magnitude of the offset voltage when the offset voltage is greater than the first signal voltage, the fifth resistor operating in series relationship with the first resistor when the control diode is forward biased to define the magnitude of the first signal voltage in proportion to the magnitude of the offset voltage as primarily determined by the voltage divider action of the first and fifth resistors such that the difference between the magnitude of the first signal voltage and the magnitude of the second signal voltage is greater than the trigger potential when the magnitude of the monitored voltage is above the upper level thereby to shift the switching means to the turned on condition; and an indicator device connected with the switching means for producing a first output signal when the switching means is in the turned on condition thereby to indicate that the magnitude of the monitored voltage is either below the lower level or above the upper level and for producing a second output signal when the switching means is in the turned off condition thereby to indicate that the magnitude of the monitored voltage is between the lower level and the upper level.

4. A detector circuit for indicating the relative magnitude of a monitored voltage with respect to an upper level and a lower level where the monitored voltage appears between first and second supply terminals, comprising: a Zener diode connected between the first supply terminal and an offset junction for operating in a pre-breakdown mode to isolate the offset junction from the first supply terminal when the magnitude of the monitored voltage is below the lower level and for operating in a breakdown mode to establish at the offset junction an offset voltage having a magnitude defined in proportion to the magnitude of the monitored voltage when the magnitude of the monitored voltage is above the lower level; a first resistor connected between a first signal junction and the second supply terminal for developing a first signal voltage thereacross at the first signal junction; a second resistor connected between a second signal junction and the second supply terminal for developing a second signal voltage at the second signal junction; first and second transistors of opposite conductivity type each switchable between a fully conductive state and a fully nonconductive state; means connecting the first transistor with the first and second signal junctions such that the first transistor is switched to the fully conductive state when the difference between the magnitude of the first signal voltage and the magnitude of the second signal voltage is greater than a predetermined trigger potential and such that the first transistor is switched to the fully nonconductive state when the difference between the magnitude of the first signal voltage and the magnitude of the second signal voltage is less than the predetermined trigger potential; means connecting the second transistor with the first transistor such that the second transistor is switched to the fully conductive state as the first transistor is switched to the fully conductive state and such that the second transistor is switched to the fully nonconductive state as the first transistor is switched to the fully nonconductive state; a third resistor connected between a first signal junction and the first supply terminal for operating in series relationship with the first resistor to define the magnitude of the first signal voltage in proportion to the magnitude of the monitored voltage as primarily determined by the resistance ratio of the first resistor to the third resistor such that the difference between the magnitude of the first signal voltage and the magnitude of the second signal voltage is greater than the trigger potential when the magnitude of the monitored voltage is below the lower level thereby to switch the first and second transistors to the fully conductive state; a fourth resistor connected between the second signal junction and the offset junction for operating in series relationship with the second resistor to define the magnitude of the second signal voltage in proportion to the magnitude of the offset voltage as primarily determined by the resistance ratio of the second resistor to the fourth resistor such that the difference between the magnitude of the first signal voltage and the magnitude of the second signal voltage is less than the trigger potential when the magnitude of the monitored voltage is between the lower level and the upper level thereby to switch the first and second transistors to the fully nonconductive state; a control diode and a fifth resistor connected in series relationship between the first signal junction and the offset junction, the control diode operating in a reverse biased mode to isolate the first signal junction from the offset junction when the offset voltage is less than the first signal voltage and for operating in a forward biased mode to define the magnitude of the first signal voltage in proportion to the magnitude of the offset voltage when the offset voltage is greater than the first signal voltage, the fifth resistor operating in series relationship with the first resistor when the control diode is forward biased to define the magnitude of the first signal voltage in proportion to the magnitude of the offset voltage as primarily determined by the resistance ratio of the first resistor to the fifth resistor which resistance ratio is greater than the resistance ratio of the second resistor to the fourth resistor such that the difference between the magnitude of the first signal voltage and the magnitude of the second signal voltage is greater than the trigger potential when the magnitude of the monitored voltage is above the upper level thereby to switch the first and second transistors to the fully conductive state; and an indicator device connected with the second transistor for producing a first output signal when the second transistor is in the fully conductive state thereby to indicate that the magnitude of the monitored voltage is either below the lower level or above the upper level and for producing a second output signal when the second transistor is in the fully nonconductive state thereby to indicate that the magnitude of the monitored voltage is between the lower level and the upper level.

5. A detector circuit for indicating the relative magnitude of a monitored voltage with respect to an upper level and a lower level where the monitored voltage appears between first and second supply terminals, comprising: a Zener diode connected between the first supply terminal and an offset junction for operating in a pre-breakdown mode to isolate the offset junction from the first supply terminal when the magnitude of the monitored voltage is below the lower level and for operating in a breakdown mode to establish at the offset junction an offset voltage having a magnitude defined in proportion to the magnitude of the monitored voltage when the magnitude of the monitored voltage is above the lower level; means connected between a first signal junction and the second supply terminal and including a first resistor for developing a first signal voltage thereacross at the first signal junction; means connected between a second signal junction and the second supply terminal and including a second resistor having a resistance of the same order of magnitude as but less than the resistance of the first resistor for developing a second signal voltage at the second signal junction; first and second transistors of opposite conductivity type each having base, emitter and collector electrodes and each operable between a fully conductive state and a fully nonconductive state; means for connecting the base electrode of the first transistor to the first signal junction and for connecting the emitter electrode of the first transistor to the second signal junction such that the first transistor switches toward the fully conductive state when the difference between the magnitude of the first signal voltage and the magnitude of the second signal voltage is greater than a predetermined trigger potential and such that the first transistor switches toward the fully nonconductive state when the difference between the magnitude of the first signal voltage and the magnitude of the second signal voltage is less than the predetermined trigger potential; means for connecting the base electrode of the first transistor to the collector electrode of the second transistor and for connecting the emitter electrode of the second transistor to the first supply terminal and for connecting the collector electrode of the second transistor to an output junction such that the second transistor switches toward the fully conductive state as the first transistor switches toward the fully conductive state and such that the second transistor switches toward the fully nonconductive state as the first transistor switches toward the fully nonconductive state; a feedback resistor connected between the output junction and the first signal junction for increasing the magnitude of the bias voltage as the second transistor switches toward the fully conductive state thereby to accelerate the switching of the first and second transistors to the fully conductive state and for decreasing the magnitude of the first signal voltage as the second transistor switches toward the fully nonconductive state thereby to accelerate the switching of the first and second transistors to the fully nonconductive state; means connected between the first signal junction and the first supply terminal and including a third resistor having a resistance several orders of magnitude greater than the resistance of the first resistor for operating in series relationship with the first resistor to define the magnitude of the first signal voltage in proportion to the magnitude of the monitored voltage as primarily determined by the voltage divider action of the first and third resistors such that the difference between the magnitude of the first signal voltage and the magnitude of the second signal voltage is greater than the trigger potential when the magnitude of the monitored voltage is below the lower level thereby to switch the first and second transistors to the fully conductive state; means connected between the second signal junction and the offset junction and including a fourth resistor having a resistance of the same order of magnitude as but greater than the second resistor for operating in series relationship with the second resistor to define the magnitude of the second signal voltage in proportion to the magnitude of the offset voltage such that the difference between the magnitude of the first signal voltage and the magnitude of the second signal voltage is less than the trigger potential when the magnitude of the monitored voltage is between the upper level and the lower level thereby to switch the first and second transistors to the fully nonconductive state; means connected between the first signal junction and the offset junction and including a control diode for operating in a forward biased mode to isolate the first signal junction from the offset junction when the offset voltage is less than the first signal voltage and for operating in a forward biased mode to define the magnitude of the first signal voltage in proportion to the magnitude of the offset voltage when the offset voltage is greater than the first signal voltage, the means further including a fifth resistor having a resistance of the same order of magnitude as but less than the first resistor and several orders of magnitude less than the third resistor for operating in series relationship with the first resistor to define the magnitude of the first signal voltage in proportion to the magnitude of the offset voltage as primarily determined by the voltage divider action of the first and fifth resistors such that the difference between the magnitude of the first signal voltage and the magnitude of the second signal voltage is greater than the trigger potential when the magnitude of the monitored voltage is above the upper level thereby to switch the first and second transistors to the fully conductive state; and an indicator device connected between the output junction and the second supply terminal for producing a first output signal when the second transistor is in the fully conductive state thereby to indicate that the magnitude of the monitored voltage is either below the lower level or above the upper level and for producing a second output signal when the second transistor is in the fully nonconductive state thereby to indicate that the magnitude of the monitored voltage is between the lower level and the upper level.

* * * * *

PO-1050
(5/69)

UNITED STATES PATENT OFFICE
CERTIFICATE OF CORRECTION

Patent No. 3,820,099     Dated June 25, 1974

Inventor(s) Kenneth S. Vogt

It is certified that error appears in the above-identified patent and that said Letters Patent are hereby corrected as shown below:

Column 1, line 20, delete "detector";

Column 3, line 59, delete "9";
Column 4, line 42, delete "9";
Column 5,
    line 17, delete "signal"
    line 48, "phms" should be -- ohms --;
    line 62, "ivnention" should be -- invention --; and
Column 6, line 17, after "offset" insert -- voltage --.

Signed and sealed this 29th day of April 1975.

(SEAL)
Attest:

RUTH C. MASON
Attesting Officer

C. MARSHALL DANN
Commissioner of Patents
and Trademarks